(12) United States Patent
Jo

(10) Patent No.: US 8,446,644 B2
(45) Date of Patent: May 21, 2013

(54) SCANNER APPARATUS

(75) Inventor: Yong Joo Jo, Gyunggi-do (KR)

(73) Assignee: Samsung Electro-Mechanics Co., Ltd., Suwon, Gyunggi-do (KR)

(*) Notice: Subject to any disclaimer, the term of this patent is extended or adjusted under 35 U.S.C. 154(b) by 655 days.

(21) Appl. No.: 12/625,515

(22) Filed: Nov. 24, 2009

(65) Prior Publication Data

US 2011/0051205 A1 Mar. 3, 2011

(30) Foreign Application Priority Data

Aug. 31, 2009 (KR) .................. 10-2009-0081433

(51) Int. Cl.
*H04N 1/04* (2006.01)

(52) U.S. Cl.
USPC ............ 358/474; 358/483; 358/482; 359/794

(58) Field of Classification Search
USPC .................. 358/483, 474, 501, 482; 359/794, 359/793
See application file for complete search history.

(56) References Cited

U.S. PATENT DOCUMENTS

| | | | | |
|---|---|---|---|---|
| 6,252,684 | B1 * | 6/2001 | Lin | 358/498 |
| 7,038,819 | B2 * | 5/2006 | Fang et al. | 358/474 |
| 7,116,412 | B2 * | 10/2006 | Takahashi et al. | 356/138 |
| 7,225,984 | B2 * | 6/2007 | Harris et al. | 235/454 |
| 7,508,554 | B2 * | 3/2009 | Tomita et al. | 358/483 |
| 7,630,142 | B2 * | 12/2009 | Nishimura | 359/687 |
| 7,787,159 | B2 * | 8/2010 | Baldwin | 358/482 |
| 8,107,139 | B2 * | 1/2012 | Chen | 358/509 |

* cited by examiner

*Primary Examiner* — Negussie Worku

(74) *Attorney, Agent, or Firm* — Blakely Sokoloff Taylor & Zafman LLP

(57) ABSTRACT

Disclosed herein is a scanner apparatus. The scanner apparatus includes a light source, a reflecting means and an imaging means. The light source is located under an object, and radiates light so that the light is reflected from the object. The reflecting means is placed under the light source at a specific angle of inclination with respect to a surface of the object, and folds the path of the light when the light radiated by the light source is reflected from the object. The imaging means is placed along the path of the light reflected from the reflecting means, and condenses light reflected from the reflecting means and then acquires an image of the object.

12 Claims, 4 Drawing Sheets

SCANNER APPARATUS

CROSS REFERENCE TO RELATED APPLICATION

This application claims the benefit of Korean Patent Application No. 10-2009-0081433, filed on Aug. 31, 2009, entitled "Scanner Apparatus," which is hereby incorporated by reference in its entirety into this application.

BACKGROUND OF THE INVENTION

1. Technical Field

The present invention relates generally to a scanner apparatus, and, more particularly, to a scanner apparatus, the size and scan time of which can be reduced using a reflecting means.

2. Description of the Related Art

When facsimile or scanner equipment was first developed, the development of color technology for image input devices had not yet been actively developed. However, currently, the use of the color technology has become popularized, so that in order to achieve high resolution, it is necessary to acquire the resolution of an image pickup device such as a Charge Coupled Device (CCD).

Accordingly, in order to achieve the desired contrast for a high spatial frequency, a reduction in the quantity of surrounding light must be extremely decreased, so that the aperture efficiency must be set to 100% and the distortion aberration must be corrected most perfectly.

Such a type of conventional scanner apparatus employs a method using a CCD pickup scanner disposed along the path of light reflected from an object and transmitted through a lens for a scanner and a photoelectric conversion signal corresponding to a light source. Here, with respect to an object, a one-line pixel image on a lateral side is scanned, this optical block is moved in a vertical direction, and the charging and discharging of a CCD are repeated, thereby acquiring a pixel image on a vertical side.

The conventional scanner apparatus is problematic in that the overall size of the scanner apparatus is increased because a CCD image pickup device is disposed directly on an optical path and in that a long overall scan time is required because an image of the overall object is acquired using a line scan method.

SUMMARY OF THE INVENTION

Accordingly, the present invention has been made keeping in mind the above problems occurring in the prior art, and the present invention is directed to the provision of a scanner apparatus which folds the path of light reflected from an object using a reflecting means, thereby reducing the overall size of the scanner apparatus.

The present invention is directed to a scanner apparatus which employs a 2D plane scan method instead of a line scan method, thereby reducing the scan time required to scan the overall object.

In order to accomplish the above objects, the present invention provides a scanner apparatus, including a light source located under an object, and configured to radiate light so that the light is reflected from the object; reflecting means placed under the light source at a specific angle of inclination with respect to a surface of the object, and configured to fold a path of the light when the light radiated by the light source is reflected from the object; and imaging means placed along a path of the light reflected from the reflecting means, and configured to condense light reflected from the reflecting means and then acquire an image of the object.

The light source may be a Light Emitting Diode (LED) or a fluorescent lamp.

The reflecting means may be a minor.

The imaging means may include image lenses for condensing the light reflected from the reflecting means; and an image sensor for receiving the light condensed by the image lens and then acquiring the image of the object.

The image lenses may include a first lens group configured to comprise a first lens with negative refractive power and a second lens with negative refractive power, the first and second lenses being disposed along a single optical axis from the object to the image, and to have negative refractive power as a whole; a second lens group configured to comprise a third lens with positive refractive power; a third lens group configured to comprise a fourth lens with positive refractive power and a fifth lens with positive refractive power, and to have positive refractive power as a whole; a fourth lens group configured to comprise a sixth lens with positive refractive power; and an iris diaphragm disposed between the second lens group and the third lens group.

The first lens group may be configured such that the first lens is a meniscus lens a surface of which facing the object is convex, the second lens is a biconcave lens two opposite surfaces of which are concave, and at least one of the first and second lenses is an aspherical lens so as to correct distortion aberration.

The third lens may be a relay lens two opposite surfaces of which are convex.

The third lens group may be configured such that the fourth lens is a biconcave lens two opposite surfaces of which are concave, the fifth lens is a biconvex lens two opposite surfaces of which are convex, and the fourth and fifth lenses form a cemented lens for correcting chromatic aberration.

The sixth lens may be a meniscus lens the surface of which facing the object is concave.

The image lenses may be configured to have a focal distance that satisfies the following conditional equation:

$$5 < TF < f < 10$$

where TF is the distance to the object and f is the total focal distance of the image lenses.

The image sensor may be any one of a Charge Coupled Device (CCD) and a Complementary Metal Oxide Semiconductor (CMOS).

The angle of inclination may be within a range of 25° to 45°.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
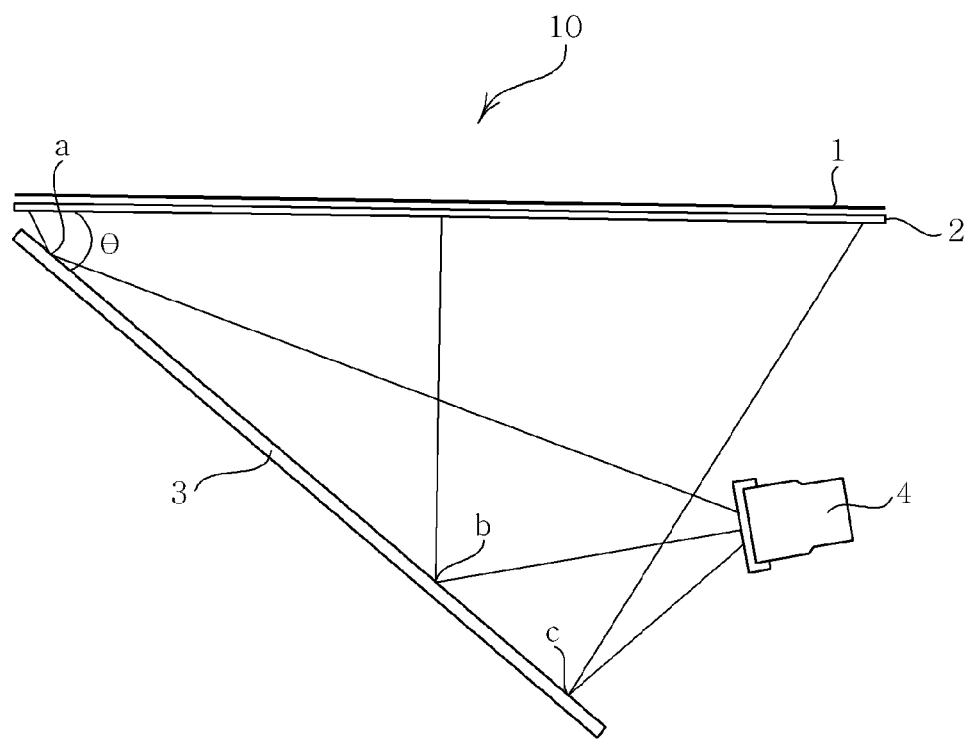
FIG. 1 is a side view showing a scanner apparatus according to a preferred embodiment of the present invention.

Reference now should be made to the drawings, in which the same reference numerals are used throughout the different drawings to designate the same or similar components.

FIG. 1 is a side view showing a scanner apparatus 10 according to a preferred embodiment of the present invention.

Referring to FIG. 1, the scanner apparatus 10 according to a preferred embodiment of the present invention includes a light source 2 for scanning an object 1, reflecting means 3, and imaging means 4.

The light source 2 is located below a scanner plane on which the object 1 is disposed, and radiates light so that the radiated light is reflected from the object 10. Furthermore, the light source 2 is installed such that it surrounds the outer edge of the scan region of the scanner plane on which the object 1 is placed. For example, a Light Emitting Diode (LED) or a fluorescent lamp is used as the light source 2.

The reflecting means 3 is disposed below the light source 2 at an angle of inclination with respect to the surface of the object 1 (for example, a surface to be scanned), and folds the path of the light when the light radiated by the light source is reflected from the object.

Here, the term "folding" is defined as the path of the light radiated by the light source 2 and then reflected from the object 1 being bent at contact points a, b and c on the reflecting means 3, as shown in FIG. 1.

Furthermore, a mirror is chiefly used as the reflecting means 3, and the area of the reflecting means 3 may be implemented to be slightly smaller than that of the scan region of the plane on which the object 1 is placed.

The imaging means 4 is disposed on the path of the light reflected from the reflecting means 3, and condenses the light reflected from the reflecting means 3 and then acquires an image of the object 1.

In order to acquire a high-resolution image of the object 1 using the imaging means 4, light beams folded by the reflecting means 3 should be received by the imaging means 4 without overlapping each other.

Accordingly, the angle of inclination θ between the surface of the object 1 and the reflecting means 3 is within a range from 25° to 45°, preferably 30°.

If the angle of inclination θ is less than 25°, the imaging means 4 should be placed at a location higher than that of the object 1 so that the light beams folded by the reflecting means 3 do not overlap each other. In contrast, if the angle of inclination θ is greater than 45°, the imaging means 4 should be installed at a lower location corresponding to the angle of inclination of the reflecting means 3 so that the light beams folded by the reflecting means 3 do not overlap each other, so that the size of the scanner apparatus 10 is increased.

Meanwhile, the imaging means 4 includes image lenses 41~48 for condensing the light reflected from the reflecting means 3 and an image sensor 49 for receiving the condensed light from the image lenses 41~48 and then acquiring an image of the object 1. This imaging means 4 is shown in FIG. 2.

Figure 2:
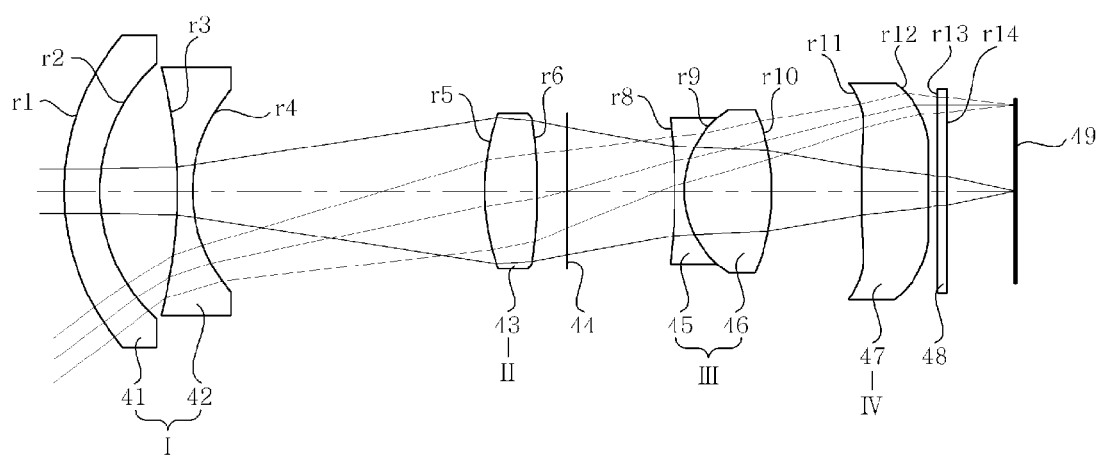
FIG. 2 is a diagram showing the imaging means shown in FIG. 1.

Referring to FIG. 2, the image lenses 41~48 include four groups of lenses 41~47 (including six lenses) and an infrared-cut (IR) filter 48.

The image lenses 41~48 include a first lens group I, a second lens group II, a third lens group III, and a fourth lens group IV arranged along the same optical axis sequentially from the object 1 to the image.

Furthermore, an iris diaphragm 44 is disposed between the second lens group II and the third lens group III. The iris diaphragm 44 is disposed in the middle of the image lenses 41~48, a lens (for example, the third lens 43) close to the iris diaphragm 44 is configured to be aspherical to correct spherical aberration, and the first lens 41 far from the iris diaphragm 44 is configured to be aspherical to correct distortion aberration.

First, the first lens group I includes a first lens 41 with negative refractive power and a second lens 42 with negative refractive power, and has negative refractive power as a whole.

Here, the first lens 41 includes a meniscus lens the surface of which facing an object is formed to be convex, and the second lens 42 includes a biconcave lens both surfaces of which are concave. In particular, when the first lens 41 is configured such that the surface thereof facing an object is concave, distortion aberration characteristics are decreased.

Furthermore, the first lens group I should be configured such that at least one of the surfaces of the first and second lenses 41 and 42 is aspherical so as to correct distortion aberration. In other words, at least one of the first and second surfaces r1 and r2 of the first lens 41 and the first and second surfaces r3 and r4 of the second lens 42 should be aspherical.

The second lens group II includes a third lens 43 with positive refractive power. The second lens group II includes a single lens, and is a relay lens which connects the first lens group I and the third lens group III to each other and has two opposite convex surfaces.

The third lens group III includes a fourth lens 45 with positive refractive power and a fifth lens 46 with positive refractive power, and has positive refractive power as a whole.

Here, the fourth lens 45 is formed of a biconcave lens with two concave surfaces, the fifth lens 46 is formed of a biconvex lens with two convex surfaces, and the fourth lens 45 and the fifth lens 46 are cemented into a cemented lens.

The cemented lens of the third lens group III corrects (eliminates) chromatic aberration.

The fourth lens group IV includes a sixth lens 47 with positive refractive power, in which case the sixth lens 47 is a meniscus lens the surface of which facing an object is concave.

Furthermore, in order to compensate for temperature for the image lenses 41~48, the refractive power of the aspherical lens of the first lens group I is designed to be contrary to that of the fourth lens group IV, while the size of the aspherical lens of the first lens group I is designed to be the same as or similar to that of the fourth lens group IV. Furthermore, the cost can be reduced and the temperature can be compensated for by replacing one lens of the first lens group I and one lens of the fourth lens group with plastic lenses.

The IR filter 48 is disposed between the fourth lens group IV and the image sensor 49 and upstream of the image sensor 49, and functions to eliminate the near-infrared wavelengths of the light condensed through the above-described four groups of lenses (6 lenses) 41~47.

The image sensor 49 is formed of a Charge-Coupled Device (CCD) or a Complementary Metal Oxide Semiconductor (CMOS).

Meanwhile, when the distance from an object to an image is TL and the total focal distance of the image lenses 41~48 is f, the image lenses 41~48 according to a preferred embodiment of the present invention are configured to satisfy the following conditional Equation (1):

$$5 < TF < f < 10 \quad (1)$$

If the image lenses 41~48 deviate from the upper limit of the above conditional Equation (1), the distance from an object to an image is excessively increased, so that it is difficult to implement the image lenses 41~48 in the form of an actual product. In contrast, if the image lenses 41~48 deviate from the lower limit of the above conditional Equation (1), a Field of view (FOV) is excessively increased, so that it is difficult to correct the distortion of the image lenses 41~48.

Furthermore, when the focal distance of the first lens 41 is f1, the focal distance of the second lens 42 is f2, the focal distance of the third lens 43 is f3, the focal distance of the fourth lens 45 is f4, the focal distance of the fifth lens 46 is f5 and the focal distance of the sixth lens 47 is f6, the image lenses 41~48 are configured to satisfy the following conditional Equations (2)~(6):

$$f1/f = -5.08 \quad (2)$$

$$f2/f = -2.01 \quad (3)$$

$$f3/f = 1.90 \quad (4)$$

$$f4/f = 359 \quad (5)$$

$$f5/f = 4.94 \quad (6)$$

Under these conditions, the design data of the image lenses of the scanner apparatus 10 according to the preferred embodiment of the present invention is shown in the following Table 1:

TABLE 1

| Surface No. | Radius of Curvature (RDY) | Thickness (THI) | Refractive index (Nd) | Abbe Number (vd) |
|---|---|---|---|---|
| Object OBJ | ∞ | 247.000000 | | |
| 1 | 44.00976 | 2.044941 | 1.544000 | 61.3000 |
| 2 | 14.54647 | 5.402118 | | |
| 3 | −32.33685 | 1.022471 | 1.487489 | 70.4412 |
| 4 | 10.55699 | 20.171219 | | |
| 5 | 13.36449 | 3.743816 | 1.589129 | 61.2526 |
| 6 | −24.57338 | 1.834107 | | |
| STO | ∞ | 0.217023 | | |
| 8 | −165.40747 | 0.943819 | 1.728250 | 28.3205 |
| 9 | 6.842181 | 5.977521 | 1.516800 | 64.1673 |
| 10 | −16.16538 | 6.269616 | | |
| 11 | 23.51757 | 4.719096 | 1.544000 | 61.3000 |
| 12 | −255.27287 | 0.629213 | | |
| 13 | ∞ | 0.629213 | 1.516800 | 64.1673 |
| 14 | ∞ | 4.776936 | | |
| IMG | ∞ | 0.029191 | | |

Figure 3:
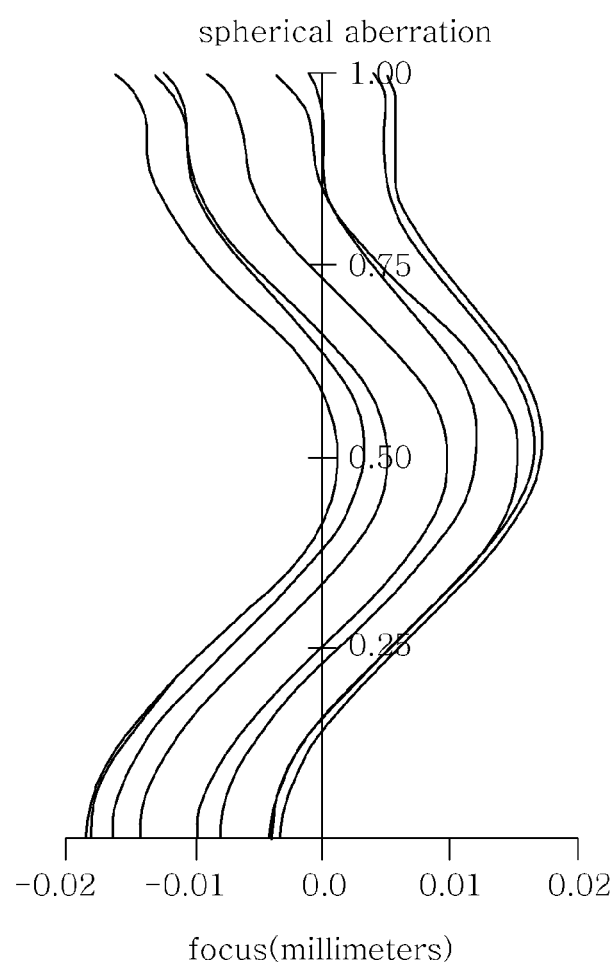
FIG. 3 is a graph showing spherical aberration depending on the wavelength of image lenses according to a preferred embodiment of the present invention.
Figure 4:
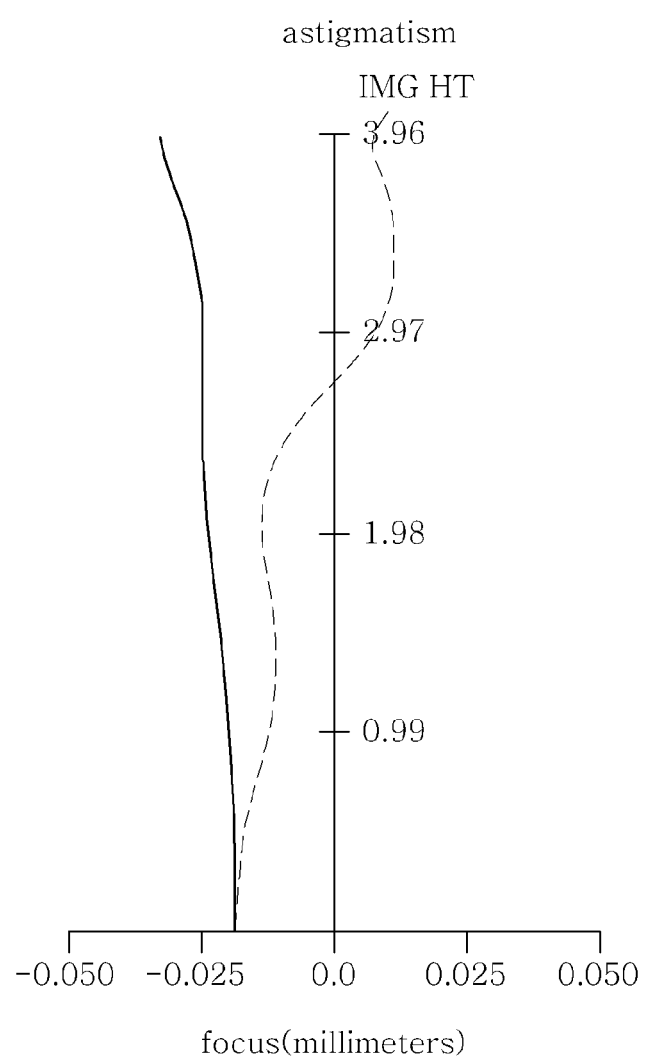
FIG. 4 is a graph showing astigmatism according to the preferred embodiment of the present invention.
Figure 5:
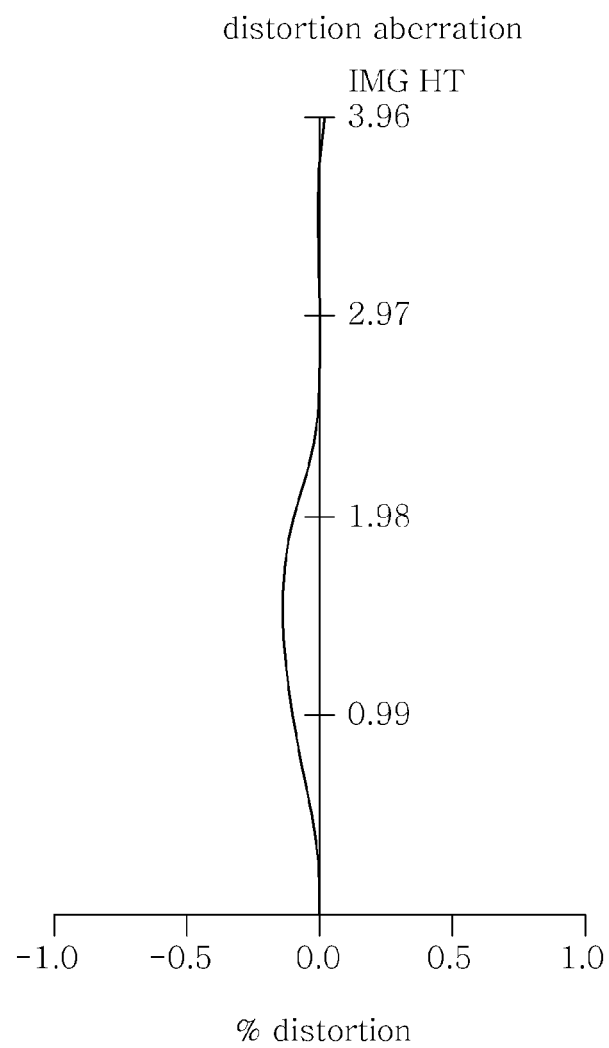
FIG. 5 is a graph showing % distortion according to the preferred embodiment of the present invention.

Furthermore, graphs showing results of tests of the image lenses according to the preferred embodiment of the present invention are shown in FIGS. 3 to 5.

Here, FIG. 3 is a graph showing spherical aberration depending on the wavelength of the image lenses according to the preferred embodiment of the present invention, FIG. 4 is a graph showing astigmatism according to the preferred embodiment of the present invention, and FIG. 5 is a graph showing % distortion according to the preferred embodiment of the present invention.

As described above, the scanner apparatus 10 according to the preferred embodiment of the present invention can reduce the size of the scanner apparatus 10 using the reflecting means 3, can acquire high optical characteristics by desirably correcting spherical aberration, astigmatism and distortion aberration using high-resolution image lenses, and can reduce scan time by scanning the overall image of an object at one time.

The present invention has the advantage of reducing the overall size of the scanner apparatus by folding the path of light reflected from an object using a reflecting means.

Furthermore, the present invention has the advantage of reducing the scan time required to scan the overall object using a 2D plane scan method instead of a line scan method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scanner apparatus, comprising:
   a light source to be located under an object and to instantaneously radiate light to substantially more than a line upon the object so as to surround the edge of a scan region of a scanner so that the light is reflected from substantially more than a line from the object;
   a reflecting device placed under the light source to be fixed at a specific angle of inclination with respect to a surface of the object over the course of the object's illumination by the light, and configured to fold a path of the light when the light radiated by the light source is reflected from the object, an area of the reflecting device being smaller than the scan region; and
   an imaging unit placed along a path of the light reflected from the reflecting device, and configured to condense light reflected from the reflecting device and then acquire an image of the object.

2. The scanner apparatus as set forth in claim 1, wherein the light source is a Light Emitting Diode (LED) or a fluorescent lamp.

3. The scanner apparatus as set forth in claim 1, wherein the reflecting device is a mirror.

4. The scanner apparatus as set forth in claim 1, wherein the imaging unit comprises:
   image lenses for condensing the light reflected from the reflecting device; and
   an image sensor for receiving the light condensed by the image lens and then acquiring the image of the object.

5. The scanner apparatus as set forth in claim 1, wherein the image lenses comprise:
   a first lens group configured to comprise a first lens with negative refractive power and a second lens with negative refractive power, the first and second lenses being disposed along a single optical axis from the object to the image, and to have negative refractive power as a whole;
   a second lens group configured to comprise a third lens with positive refractive power;
   a third lens group configured to comprise a fourth lens with positive refractive power and a fifth lens with positive refractive power, and to have positive refractive power as a whole;
   a fourth lens group configured to comprise a sixth lens with positive refractive power; and
   an iris diaphragm disposed between the second lens group and the third lens group.

6. The scanner apparatus as set forth in claim 5, wherein the first lens group is configured such that the first lens is a meniscus lens a surface of which facing the object is convex, the second lens is a biconcave lens two opposite surfaces of which are concave, and at least one of the first and second lenses is an aspherical lens so as to correct distortion aberration.

7. The scanner apparatus as set forth in claim 5, wherein the third lens is a relay lens two opposite surfaces of which are convex.

8. The scanner apparatus as set forth in claim 5, wherein the third lens group is configured such that the fourth lens is a biconcave lens two opposite surfaces of which are concave, the fifth lens is a biconvex lens two opposite surfaces of which are convex, and the fourth and fifth lenses form a cemented lens for correcting chromatic aberration.

9. The scanner apparatus as set forth in claim 5, wherein the sixth lens is a meniscus lens a surface of which facing the object is concave.

10. The scanner apparatus as set forth in claim 5, wherein the image lenses are configured to have a focal distance that satisfies the following conditional equation:

$$5 < TF < f < 10$$

where TF is a distance to the object and f is a total focal distance of the image lenses.

11. The scanner apparatus as set forth in claim 1, wherein the image sensor is any one of a Charge Coupled Device (CCD) and a Complementary Metal Oxide Semiconductor (CMOS).

12. The scanner apparatus as set forth in claim 1, wherein the angle of inclination is within a range of 25° to 45°.

* * * * *